United States Patent [19] [11] 4,091,195
Vitek [45] May 23, 1978

[54] HOT-MELT ADHESIVE COMPOUND AND METHOD FOR THE PRODUCTION OF THE SAME

[75] Inventor: Robert Vitek, Maria Enzersdorf, Austria

[73] Assignee: Kores Holding Zug AG., Zug, Switzerland

[21] Appl. No.: 709,539

[22] Filed: Jul. 28, 1976

[30] Foreign Application Priority Data

Aug. 8, 1975 Austria ................................ 6167/75

[51] Int. Cl.² ............................ C09J 3/12; C09J 3/14; C09J 7/02; C09J 7/04
[52] U.S. Cl. ...................................... 526/52; 156/334; 156/338; 260/79.5 A; 260/79.5 P; 260/768 R; 260/773; 260/775; 427/207 A; 428/343; 428/349; 428/355; 428/356; 526/49; 526/57
[58] Field of Search ................ 156/334, 338; 428/343, 428/355, 356, 349; 260/775, 79.5 P, 79.5 A, 773, 768; 526/49, 57, 52; 427/207 A

[56] References Cited

U.S. PATENT DOCUMENTS

| 2,708,192 | 5/1955 | Joesting et al. .................... 428/355 |
| 2,881,096 | 4/1959 | Kisbany ................................ 428/355 |
| 3,005,804 | 10/1961 | Miller et al. .................... 260/79.5 A |
| 3,426,003 | 2/1969 | Leib et al. ...................... 260/79.5 A |
| 3,597,377 | 8/1971 | Berejka et al. ...................... 260/844 |
| 3,711,454 | 1/1973 | Usamoto et al. ...................... 526/52 |
| 3,763,110 | 10/1973 | Oertel et al. .......................... 526/52 |
| 3,784,587 | 1/1974 | Chambers ...................... 260/876 B |
| 3,825,510 | 7/1974 | Yamamoto et al. .................... 526/57 |
| 3,880,953 | 4/1975 | Downey ........................... 260/876 B |
| 3,894,996 | 7/1975 | Srail .............................. 260/79.5 A |
| 3,923,947 | 12/1975 | Cook ..................................... 526/57 |
| 3,932,328 | 1/1976 | Korpman ........................... 428/355 |
| 3,956,223 | 5/1976 | Chiang et al. ...................... 428/355 |
| 3,956,253 | 5/1976 | Braun ..................................... 526/57 |
| 3,962,161 | 6/1976 | Trapasso ............................... 526/52 |

FOREIGN PATENT DOCUMENTS

| 266,599 | 11/1963 | Australia .................... 260/79.5 PR |
| 1,300,559 | 12/1972 | United Kingdom ............ 260/876 B |

Primary Examiner—Ronald W. Griffin
Attorney, Agent, or Firm—Ernest F. Marmorek

[57] ABSTRACT

A hot-melt adhesive produced from a number of polymers which have been at least partially cross-linked and which may be applied to a suitable carrier as a melt.

14 Claims, 1 Drawing Figure

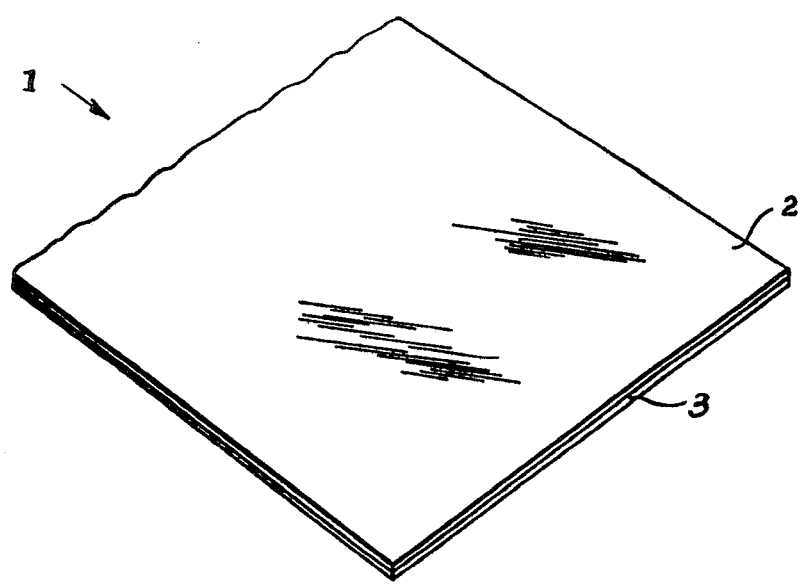

HOT-MELT ADHESIVE COMPOUND AND METHOD FOR THE PRODUCTION OF THE SAME

BACKGROUND OF THE INVENTION

The invention relates to a contact adhesive and the method for producing the same which is to be applied to a suitable backing or adhesive carrier without the use of a solvent or dispersal medium. These adhesives are used on self-adhesive products, for example, on Kraft packaging tapes or other similar self-adhesive tapes and as a backing for sheets of self-sticking covering material and the like. The invention also relates to the self-adhesive product and the method for making the same.

The prior art methods of applying such an adhesive onto a suitable carrier required that the adhesive be dissolved or dispersed in a suitable organic solvent. The solvent was thereafter applied to the carrier or support material and evaporated, leaving behind the pressure sensitive contact adhesive compound. Unfortunately, this process results in a large amount of solvent vapors being released into the atmosphere with the accompanying health hazard to a person breathing these vapors and a possible fire or explosion hazard due to the inflammable nature of many solvents. As the carrier material is frequently made of a synthetic polymeric material, an explosion hazard compounded by the danger of an electrostatic charge building up and sparking, especially at high processing rates, providing an ignition source for the organic solvent vapors, is prevalent.

A further disadvantage of the prior art method is that the rate of production is relatively slow due to the method of application of the adhesive.

Attempts to avoid the use of solvents and to apply hot-melt adhesives to the backing, by working at higher temperatures, within the fusion range or melting point range of the adhesives have previously been less than successful. It has been found that the higher temperatures result in problems which manifest themselves in a number of ways and, depending on the final use of the material, need to be at least partially solved.

The most common problem involves the oxidation and temperature stability of the adhesive mixtures. Temperatures in excess of 100° C are normally used for the mastication or homogenization process and, for the application of the adhesive to the backing, the adhesive must have a low enough viscosity to allow its application to the backing.

It has been a frequent practice to use material with a low value of polymerization and a large proportion of plasticizers, in order to prepare an adhesive with a low viscosity. Unfortunately, this results in a contact adhesive with a low endurance limit making them less suitable for jobs which require good adhesive strength while under continuous stress. The resulting contact adhesives could therefore only be used for certain purposes wherein continuous loads or stresses are not applied to the secured together parts.

Attempts to prepare a suitable hot-melt adhesive which can be applied to a suitable backing material or adhesive carrier, include the use of styrene and butadiene copolymers or styrene and isoprene copolymers with the addition of modified or unmodified rosin or rosin esters, coumarone-indene-resins, polyterpene-resins, aliphatic diene-olefin-hydrocarbon resins, polystyrene resins, copolymers of ethylene, vinyl acetate or polypropylene. Copolymers of vinyl esters with additions of various waxes have also been tried.

As noted above, however, these adhesives have been found inadequate in that their resistance to continuous load or stress is of too low an order of magnitude. A typical adhesive produced by the prior art methods, normally has a continuous load and stress resistance of only a few minutes when a load of 1.5 kg at 25° C is applied to a tape having a width of 1 cm.

Hot-melt adhesives prepared using a base of ethylene-vinyl acetate copolymers and chlorinated hydrocarbons have found only limited use because of their low stress resistance. In particular, they are used in the laying of carpets in order to make the bottom side of the carpet "non-skidding".

Attempts to prepare a hot-melt adhesive using rubber as a base, have similarly been less than satisfactory. Thus, it has not been previously possible to prepare adhesives which can be applied to a suitable backing in a melt form, and which have or retain a high resistance to continuous loads and stresses. This type of material has great application in, for example, the packaging industry wherein packaging tapes capable of withstanding large continuous loads without releasing from the package, are in demand.

SUMMARY OF THE INVENTION

One of the principal objects of the invention is to provide a hot-melt adhesive compound which is to be applied to a suitable adhesive carrier, in a molten form. A further object of the invention is to provide a adhesive compound which can be heated to form a molten product with a low enough viscosity to be easily applied to an adhesive carrier, while resulting in a final self-adhesive product with high stress or load resistance.

Further objects and advantages of the invention will be set forth in part in the following specification and in part will be obvious therefrom without being specifically referred to, the same being realized and attained as pointed out in the claims hereof.

Other objects of the invention will in part be obvious and will in part appear hereinafter.

With the above and other objects of the invention in view, the invention consists in the novel methods, construction, arrangement and combination of various devices, elements and parts, as set forth in the claims hereof, certain embodiments of the same being illustrated in the accompanying drawing and described in the specification.

The invention accordingly comprises the features of construction, combination of elements and arrangement of parts which will be exemplified in a construction hereinafter set forth and in several steps and the relation of one or more of such steps with respect to each of the others, all as exemplified in the following detailed disclosure, and the scope of the application of which will be indicated in the claims.

BRIEF DESCRIPTION OF THE DRAWINGS

In the accompanying drawing, the single FIGURE is an elevational view of a self-adhesive product according to the instant invention.

DESCRIPTION OF THE PREFERRED EMBODIMENT

In carrying the invention into effect in the embodiments which have been selected for illustration in the accompanying drawing and for description in the specification, and referring now particularly to the drawing, which shows a self-adhesive product 1 composed of an adhesive carrier such as kraft paper 2 and a hot-melt adhesive compound 3.

The hot-melt adhesive compound, which is also the subject of the instant application, is based on an improvement over known adhesives especially in that the chains of the polymers on which the adhesive is based are at least partially cross-linked.

Block polymers with only cross-linked groups as well as mixtures of cross-linked and non-cross-linked group polymers may be used in practicing the instant invention. The preferred contact adhesive compound has approximately 0.1 to approximately 10 percent cross-linkage and a molecular weight of from about 100,000 to 1,000,000. It has been found that these parameters result in a contact adhesive compound with a high degree of continuous load and stress resistance, about eight times that found in prior art adhesive compounds, and a low enough melt viscosity to facilitate application to an adhesive carrier. If the degree of cross-linkage is much lower than 0.1 percent, the continuous load and stress resistance of the product deteriorates. A much higher degree of cross-linkage than 10 percent can result in the loss of adhesive properties of the product, due to an almost complete cross-linking of the polymers.

In essence, the hot-melt adhesive product is prepared by partially transversally cross-linking polymers using a cross-linking agent and cross-linking accelerators.

The partial cross-linking can be brought about by partial vulcanization, that is by using sulfur as a cross-linking agent. A mixture of one or several polymers, for example polybutadiene, polystyrene, polyisoprene, natural rubber, chlorinated butyl rubber, polyethylene, polypropylene, and sulfur is homogenized preferably by mastication, in a temperature range of 100°–160° C, preferably 130° C to about 160° C. Subsequently, the temperature is brought to the range of about 80° C to about 120° C and preferably to 100° C to about 110° C. A vulcanization accelerator is then added which brings about the transversal cross-linkage with sulfur. Precipitated sulfur in quantities of about 0.01 percent to about 10 percent by weight is preferably added.

Sulfur cross-linking or vulcanization accelerators which have been found particularly useful include ammonium salts of dithiocarbamic, sodium dithiocarbamates, zinc dithiocarbamates, thiuram, mercapto accelerators, sulfonamide accelerators, aldehyde amide accelerators, guanidine accelerators, basic amine accelerators and any of the usual vulcanization agents employed for vulcanizing butyl rubbers, such as p-benzoquinone dioxime. The preferred amount of accelerator to be added is in the range of approximately 0.01 percent to about 10 percent by weight.

Other cross-linking agents which may be used in place of sulfur may be based on mon-, di-, tri-, or poly-isocyanates. Aliphatic or aromatic peroxides may also be used. A quantity of from about 0.01 percent to about 15 percent by weight of the non-sulfur cross-linking agents has been found a suitable quantity. It is preferred that the non-sulfur cross-linking agents be added at a lower temperature than that at which the homogenization of the polymers takes place and preferably just before the application of the contact adhesive compound to the adhesive carrier.

A hot-melt adhesive product according to the instant invention, normally has a viscosity of $10^6$ to $10^9$ cp at 120° to 130° C. The degree of cross-linking should, as noted above, preferably be between 0.1 percent and 10 percent, in order that the adhesive compound will have optimum adhesive properties. Hot-melt adhesive compounds produced according to the instant invention preferably have a molecular weight of from about 100,000 to 1,000,000.

The cross-linking bridges which are formed when sulfur is used as a cross-linking agent are composed of sulfur. In the case of cross-linking agents based on mono-, di-, tri-, and poly-isocyanates or the oxidizing cross-linkage aliphatic or aromatic peroxide compounds, the bridges formed may be partially urea bridges, partially a polyurethane. Cross-linkage bridges formed using aliphatic or aromatic peroxides are usually oxygen bridges, however, hydrogen can also be split-off resulting in methylene group bridges.

As a result of the cross-linkage reaction, double bonds in the polymers partially disappear. The resulting hot-melt adhesive product produced according to the instant invention, are therefore partially oxidation and UV-resistant. Furthermore, their sensitivity or reactivity with respect to cations, in particular with respect to manganese and iron ions, is reduced.

Operation

The following are specific examples of the application of the instant invention.

EXAMPLE 1

In a mastication device, a mixture of

| | | |
|---|---|---|
| butadiene-styrene | 50 | parts by weight |
| block-polystyrene | 20 | parts by weight |
| "extender-oil" | 28 | parts by weight |
| precipitated sulfur | 1 | part by weight |
| ageing inhibitor | 0.9 | parts by weight | was homogenized at a temperature of 105° C. The homogeneous mixture was brought to a temperature of 95° C and mixed with 0.1 parts of thiuram as a vulcanization accelerator. Immediately thereafter, the mixture was applied onto a kraft paper support or other suitable carrier.

EXAMPLE 2

In a mastification device, a mixture of

| | |
|---|---|
| butadiene-styrene | 50 parts by weight |
| block poly-styrene | 20 parts by weight |
| "extender oil" | 25 parts by weight | was homogenized at a temperature of 140° C. The homogeneous mixture was subsequently brought to a temperature of 100° C and treated with 4 parts by weight of a cross-linking agent which is essentially thiuram ("Vulkacit" — thiuram mixed with supplementary accelerators "Vulkacit DM" and "Vulkacit AZ. Dibenzothiazyldisulfide and benzothiazyle-2-diethylsulfenamid)."

EXAMPLE 3

In a mastication or kneading device, a mixture of

| | |
|---|---|
| isoprene-ethylene-propylene polymer | 60 parts by weight |

-continued

| "extender oil" | 39 parts by weight |
| precipitated sulfur | 0.5 parts by weight |
| ageing inhibitor | 0.5 parts by weight | was homogenized at a temperature of 140° C. The homogeneous mixture was subsequently brought to a temperature of 100° C and treated with a vulcanizing or cross-linking accelerator of 0.1 parts by weight dithiocarbamic acid.

The finished adhesive compound was utilized by subsequent spreading of the compound into a sheet of synthetic polymeric material.

EXAMPLE 4

In a mastification or kneading device, a mixture of

| butadiene polymer | 30 parts by weight |
| natural rubber | 30 parts by weight |
| precipitated sulfur | 0.5 parts by weight |
| "extender oil" | 39 parts by weight |
| ageing inhibitor | 0.5 parts by weight | was homogenized at a temperature of 130° C. The homogeneous mixture was subsequently brought to a temperature of 120° C and treated with a vulcanization acceleration of 0.2 parts by weight of a Mercapto accelerator.

The finished adhesive compound was thereafter utilized by spreading it onto an adhesive carrier composed of cellophane.

EXAMPLE 5

In a mastification or kneading device, a mixture of

| chloro-butyl rubber | 25 parts by weight |
| butadiene-styrene polymer | 40 parts by weight |
| "extender oil" | 35 parts by weight | was homogenized at a temperature of 140° C. The homogeneous mixture was subsequently brought to a temperature of 100° C and reacted with 4 parts by weight of an agent based on guanidine.

The finished adhesive compound was then utilized by immediately being applied to a carrier sheet of polyvinyl chloride.

EXAMPLE 6

In a kneading or mastification device, a mixture of

| butadiene-styrene polymer | 10 parts by weight |
| isoprene | 55 parts by weight |
| ageing inhibitor | 5 parts by weight |
| "extender oil" | 30 parts by weight | was homogenized at a temperature of 150° C. The homogeneous mixture was subsequently brought to a temperature of 100° C and treated with 5 parts by weight p-benzoquinone dioxide.

The finished adhesive compound was subsequently utilized by spreading it on a carrier of Kraft paper.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A hot-melt adhesive compound, to be applied to a carrier in a molten state, having a molecular weight from about 100,000 to about 1,000,000, said compound consisting essentially of a polymeric component, which is partially transversely cross-linked by cross-linkage bridges, the degree of cross-linkage being from about 0.1 to 10%, said polymeric component being selected from the group consisting of polybutadiene, polystyrene, polyisoprene, natural rubber, chlorinated butyl rubber, polyethylene, polypropylene, copolymers thereof and a mixture thereof; and a cross-linking component forming cross-linkage bridges, selected from at least one member of the group consisting of oxygen, nitrogen, urea, urethane, and methylene.

2. A hot-melt adhesive compound, as claimed in claim 1, wherein the cross-linkage is formed by at least one member of the group consisting of oxygen, and methylene.

3. A hot-melt adhesive compound, as claimed in claim 1, wherein the cross-linkage bridge is formed by at least one member of the group consisting of nitrogen, urea and urethane.

4. A hot-melt adhesive compound in accordance with claim 1, having a viscosity of about $10^6$ to $10^9$ cp at 120° to 130° C. and a high degree of continuous load and stress resistance.

5. A hot-melt adhesive compound in accordance with claim 1, wherein said polymeric component is selected from the group consisting of butadiene-styrene, block-polystyrene, isoprene-ethylene-propylene polymer, butadiene polymer, natural rubber, chloro-butyl rubber and mixtures thereof.

6. A process for preparing an adhesive compound having a molecular weight of from about 100,000 to about 1,000,000, wherein said adhesive compound is to be applied subsequently to a carrier in a molten state, comprising the steps homogenizing at a temperature range of from about 100° C to about 160° C at least one polymer component selected from the group consisting of polybutadiene, polystyrene, polyisoprene, natural rubber, chlorinated butyl rubber, polyethylene, polypropylene, copolymers thereof and a mixture thereof;

reacting the polymeric component with a cross-linking agent selected from the group consisting of mono-isocyanates, di-isocyanates, tri-isocyanates, poly-isocyanates, aliphatic peroxides, and aromatic peroxides;

bringing the temperature of said thus reacted polymeric component into the range of from about 80° C to about 120° C; and thereafter adding a cross-linking accelerator.

7. A process, as claimed in claim 6, wherein said cross-linking accelerator is a compound chosen from the group consisting of an ammonium salt of dithiocarbamic acid, sodium dithiocarbamate, zinc dithiocarbamate, mercapto-accelerators, sulfonamide-accelerators, aldehyde-amide-accelerators and p-benzoquinone dioxime.

8. A process, as claimed in claim 6, wherein the temperature range maintained during homogenization step is 130°–160° C and the temperature maintained during addition of the cross-linking accelerator is 100°–110° C.

9. A process, as claimed in claim 6, wherein said polymeric compound consists essentially of a mixture of butadiene-styrene polymer and isoprene;
- the temperature maintained during homogenization of the mixture being about 150° C;
- the temperature thereafter being brought to about 100° C; and subsequently
- the cross-linking agent consisting essentially of p-benzoquinone dioxide, is added.

10. A process, as claimed in claim 6, wherein the homogenizing step includes mastication.

11. A self-adhesive product comprising
a carrier; and
a hot-melt adhesive compound coated on said carrier and consisting essentially of a polymeric component, which is partially transversely cross-linked by cross-linkage bridges, the degree of cross-linkage being about 0.1 to 10%, said polymeric component being selected from the group consisting of polybutadiene, polystyrene, polyisoprene, natural rubber, chlorinated butyl rubber, polyethylene and polypropylene, copolymers thereof and a mixture thereof; and
a cross-linking component forming the cross-linkage bridges selected from at least one member of the group consisting of oxygen, nitrogen, urea, urethane, and methylene.

12. A process for preparing an adhesive compound as claimed in claim 6, wherein said polymeric component is reacted with a cross-linking agent selected from the group consisting of aliphatic peroxides and aromatic peroxides.

13. A method for producing a self-adhesive product comprising an adhesive carrier coated with a contact adhesive compound having a molecular weight of from about 100,000 to 1,000,000, the steps comprising
- homogenizing at a temperature range from about 100° C to about 160° C at least one polymeric component selected from the group consisting of polybutadiene, polystyrene, polyisoprene, natural rubber, chlorinated butyl rubber, polyethylene, polypropylene, copolymers thereof and a mixture thereof;
- reacting the polymeric component with a cross-linking agent selected from the group consisting of mono-isocyanates, di-isocyanates, tri-isocyanates, poly-isocyanates, aliphatic peroxides, and aromatic peroxides;
- bringing the temperature into the range from about 80° C to about 120° C; thereafter adding a cross-linking accelerator; and subsequently
- applying the resulting compound to the carrier.

14. A process for preparing an adhesive compound as claimed in claim 6, wherein said polymeric component is reacted with a cross-linking agent selected from the group consisting of mono-isocyanate, di-isocyanates, tri-isocyanates and poly-isocyanates.

* * * * *